United States Patent [19]

Wakeland

[11] 4,411,016
[45] Oct. 18, 1983

[54] BARCODE WIDTH MEASUREMENT SYSTEM

[75] Inventor: Charles A. Wakeland, Midlothian, Tex.

[73] Assignee: Recognition Equipment Incorporated, Irving, Tex.

[21] Appl. No.: 269,130

[22] Filed: Jun. 1, 1981

[51] Int. Cl.³ .............................................. G06K 9/28
[52] U.S. Cl. ..................................... 382/62; 235/440; 235/462; 235/463; 382/67
[58] Field of Search ................ 340/146.3 Z, 146.3 D, 340/146.3 SY, 146.3 C; 235/440, 454, 462, 463, 470, 472, 494; 250/566, 568–570, 578; 382/9, 62, 67

[56] References Cited

U.S. PATENT DOCUMENTS

| | | |
|---|---|---|
| 3,033,449 | 5/1962 | Quinn et al. ................. 340/146.3 Z |
| 3,410,991 | 11/1968 | Van Berkel ................... 340/146.3 Z |
| 3,578,953 | 5/1971 | Milford et al. ................ 340/146.3 Z |
| 3,643,069 | 2/1972 | Kikuchi ......................... 340/146.3 Z |
| 3,870,865 | 3/1975 | Schneiderhan et al. ............. 235/454 |
| 4,087,790 | 5/1978 | Neff .............................. 340/146.3 Z |
| 4,108,368 | 8/1978 | Dobras ................................ 235/463 |
| 4,135,663 | 1/1979 | Nojiri et al. ........................ 235/463 |

*Primary Examiner*—Leo H. Boudreau
*Attorney, Agent, or Firm*—Richards, Harris & Medlock

[57] ABSTRACT

A single columnar array of scanning diodes is used to make width measurements of bar codes in order to read the contents thereof. The bar code is scanned utilizing a scanning procedure which directs the columnar array along the bar code such that the photo elements on the scanning array lie along an axis parallel to a line drawn horizontally through the bar codes. The same scanning array may be used to read alphanumeric characters scanning along an axis perpendicular to the columnar array.

9 Claims, 10 Drawing Figures

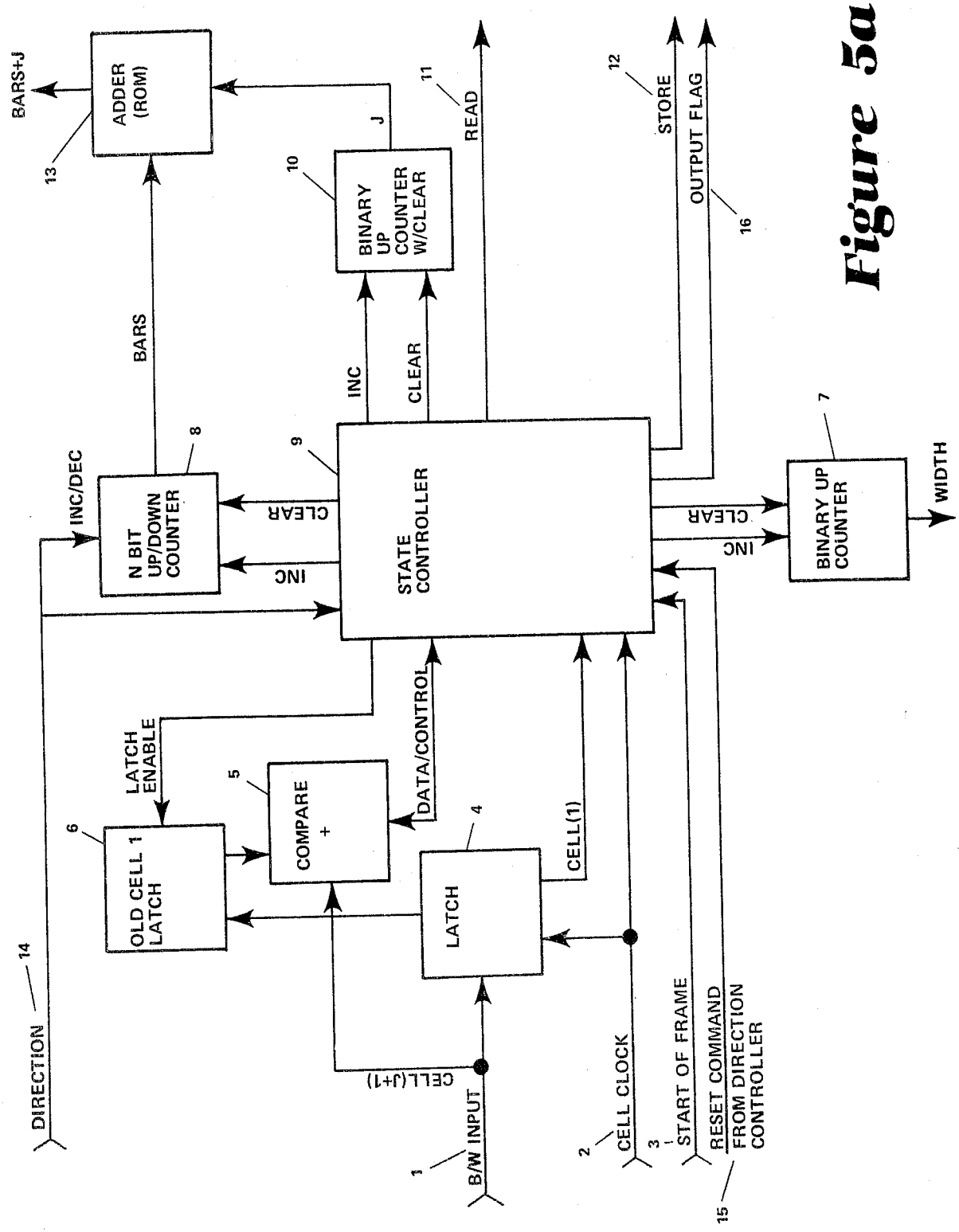

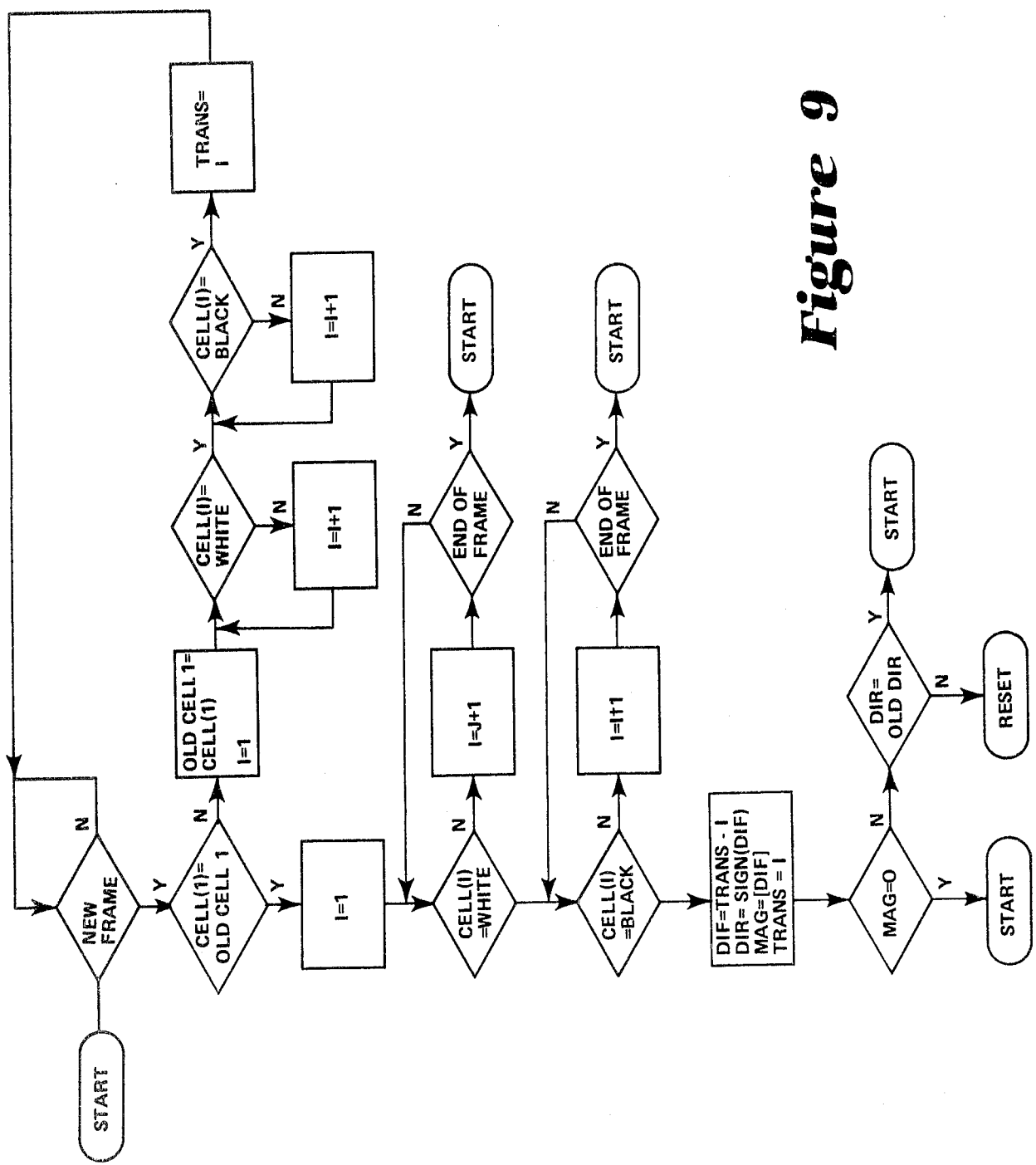

BARCODE WIDTH MEASUREMENT SYSTEM

FIELD OF INVENTION

This invention relates to bar code readers and more particularly to reading bar codes with a single columnar array.

PRIOR ART

A number of techniques have been utilized reading the various bar code formats such as UPC, codes having 5 or 7 bars and other codes with various spacing therebetween.

In one method, width information is derived from a single photo-cell. In this technique light reflected from a small area of the bar code pattern is registered by a photo-cell. The analog output of the photocell is thresholded so that pulse width is a representation of the bar width. The pulse widths are then measured by various techniques to establish a relative measure of bar width. The method is sensitive to short term speed variations and must be compensated for in the recognition process.

In another process the width is derived from an area array. A segment of a bar code pattern is imaged upon a self-scanned array. Threshold logic is used to convert the image to a black and white pattern. The bar widths must be derived from the pattern. In this system, there is a relatively low frame rate so only a few evaluations of bar widths may be made. Therefore, the error in this measurement technique may be excessive. OCR video is peaked for a narrower feature or stroke width than within wider bar code elements thereby introducing possible other errors.

In a third technique a stationary linear array is used. The measurement technique uses a stationary array upon which an entire bar code is imaged. The resolution element size must be less than or equal to ½ allowable bar width error. A cell of the array is examined and declared either to be black or white. The number of contiguous cells of the same color are used as the measure of bar width. In this technique there is a trade-off between the number of cells and resolution since the resolution determines the size of the pattern that may be read.

SUMMARY OF THE INVENTION

This invention relates to a device for reading characters and bar codes with the same columnar data lift. The characters are read by scanning with the array perpendicular to the direction of scan. Bars are read with the array parallel to the direction of the scan. Skew of up to 45° with the centerline of the barcode (scan direction) is tolerated as long as both end cells of the array pass within the area of the bar code to be read.

This process does not require the storage of video information, therefore, it is implemented as a high throughput finite state machine. The system generally has imaging optics and a self scanned array. At the output of the scan array the output is divided into two parallel outputs. One sends video information to an optical character recognition unit. The other parallel path goes to a preprocessor for the bar code reader and then to the bar reader. In general, the bar code reader and the recognition system may be as that described and claimed in co-pending U.S. patent application Ser. No. 252,555 filed Apr. 9, 1981. The optical character reader may be the same as that described in U.S. Pat. No. 4,075,605.

THE DRAWINGS

The features and technical advance represented by the invention will be better understood after reading the following description of the invention along with the drawings which are as follows:

FIG. 1 is a block diagram of the system;
FIG. 2 illustrates the scanning of bar codes;
FIG. 3 illustrates the scanning of alphanumeric data;
FIG. 4 illustrates the data structure for a memory used in the bar width processor;
FIGS. 5a and 5b are block diagrams of the bar width processor;
FIG. 6 is a flow diagram of the bar width processor;
FIG. 7 is a block diagram of the direction finder, and
FIG. 8 is a flow diagram of the direction finder reset of the bar width processor.
FIG. 9 is a flow diagram of the direction finder.

PREFERRED EMBODIMENT OF THE INVENTION

Referring to FIG. 1 there is illustrated a block representation of the invention. Bars or alphanumeric data (A) is scanned through an optics system (B), by a single columnar array (C). The output of the array is fed both to an optical character recognition unit (D) and to the bar code recognition system (E), which includes a bar code preprocessor and a bar code recognition unit. The output of each of the recognition units if fed to a decision unit (F) which outputs only one of the recognition units outputting, that which is scanned and recognized as either bar code or alphanumeric data.

FIG. 2 illustrates the scanning of bar codes by a single columnar array. The scan direction is made so that the scanning elements sequentially intercept the bar codes. Scanning may be from either direction.

FIG. 3 illustrates the scanning of alphanumeric data. The scanning is different from that of reading a bar code wherein the photo sensitive elements of a scanning array are scanned parallel across the alphanumeric data.

FIG. 4 is a block representation of the bar width processor memory which is recursively updated. The memory size is such that all bars within a scan frame may be represented in the memory. A scan frame represents a sequential scanning of the linear array. As each element is scanned again, a second frame is generated. As illustrated in FIG. 4 "BARS" represents a pointer to the bar nearest cell 1 of the array. Depending upon scan direction, this is either a bar about to exit the scan window or a bar which has just entered, since cell 1 is the first element of the array clocked out. Type is 1 or 0 and is used as the sign of the result of count/passes equals width of the bar in cells, which yields an accuracy better than the plus or minus 2 cell error possible on a given try.

Since the bar has been measured many times, through rapid successive scanning of the array, and the errors in measurement are random, it is assumed that the estimated bar width approaches a true bar width, and the difference between the true bar width and the estimated bar width is less or equal to the standard deviation for the measurement over N. For example, error is less than or equal to one cell width divided by N. Given actual bar width is greater than or equal to one resolution element.

A bar processor has been designed which adds the currently measured bar widths and increments the number of times the bar has been measured by cell 1. The tracking of the individual bar through the scan window may be accomplished using the following.

BARS is always the address of the bar nearest cell 1 of the array. BARS is incremented or decremented as a bar enters or leaves the end of the scan window at cell 1. This is indicated by a transition in the color of cell 1 between successive frames. The direction of travel indicates whether to increment or decrement BARS.

J is the number of transitions (bars) between the bar which is being measured and the bar nearest cell 1.

BARS plus J therefore indicates an address which is always associated with a particular bar.

There are three attributes associated with each bar.
(1) The number of counts equals the sum of width measurement for a given bar.
(2) The number of passes equal the number of times the bar width has been measured,
(3) The bar type (bar or space between bars) depends upon whether the bar is black or white.

The output of the bar width processor hereinafter described, is the ratio of the number of counts to the number of passes with sign equal type. This information is passed to the bar code recognition unit under the following conditions:
(1) The bar has exited the field of view from cell 1, for example, direction equals −1 and a sign change has been made on cell 1.
(2) A new bar has entered the field of view. The memory of the processor is finite (for example, 16 elements) and addressed in a wraparound or Modulo-M fashion (mode 16 for this case), therefore, after M(16) bars, information will be lost unless it is transmitted. It is assumed that M is larger than the largest number of bars that will enter the field of view so that the information will be complete on a bar before it is transmitted to the bar code recognition unit.
(3) Under explicit bar code recognition unit control, if no information has been passed to the bar code recognition unit within a specified interval, the recognition unit may examine the contents of the width processor memory. This would be the case when a bar pattern has been scanned with the end code still in the scan window and the window stationary. Under those circumstances the bar code recognition unit would interrogate the bar width memory.

The final stage of the bar width processor is a divider capable of dividing a 16 bit word by an 8 bit word. This accommodates 256 passes and allows up to a 256 element bar within the architecture defined. The sign of the result is given by the TYPE element so that the recognition unit may distinguish between black and white bars.

Referring now to FIGS. 5a and 5b, the description of the bar code width processor is as follows.

A serial string of 1's and 0's representing black and white video from a linear array enters at 1 accompanied by a cell clock 2 which makes a high to a low transistion coincident with valid black/white data from the array. A cycle of this processor is defined as from high to low transition to the next high to low transition. The video data from the I'th cell of the array is referred to as cell I. All processing of cell I is accomplished between the I'th and (I+1) transition of the cell clock counting from the high to the low transition of start of frame 3.

The LATCH 4 serves as a delay so that cell I present at the output of the latch, may be compared using COMPARATOR 5 with cell (I+1) just entering the latch. The second LATCH 6 serves as storage so that cell 1's of successive frames may be compared. LATCH 4 feeds LATCH 6 which is indirectly triggered by a start frame 3 via the state control LOGIC 9.

When the COMPARATOR 5 senses old cell 1 not equal to cell (1), it indicates that the "color" of cell 1 has changed. This implies that cell 1 has entered or left the area of a bar; for example, crossed a boundary. In the event that the DIRECTION 14 is positive, a bar has just entered the field of the array via cell 1. If direction is negative, then a bar just left through cell 1. In either case, information is output to the bar code decoder. If direction is +, the bar width information pointed to by (BARS+1) ie COUNTER 8+COUNTER 10 is output. If direction is negative, than the information indexed by BARS, ie COUNTER 8 is passed on. In both cases, the value of the memory locations which have been output are set to zero after information has been read out.

After processing cell 1, the control logic seeks the first edge or transition in the array field of view by comparing cell I and cell (I+1). When cell I is not equal to cell (I+1), J, the relative displacement COUNTER 10, is cleared to zero, and the WIDTH COUNTER 7 is set to 1. Now the logic increments the width counter on a cell by cell basis until a transition is encountered, i.e. Cell (I)=Cell (I+1). The width counter is then added to the memory indexed by the value of BARS+J 13 by "reading" the memory using the read line 11, and latching the output of memory into the ADDER 20. The output of the ADDER 20 is then the total number of cells counted as associated with the bar represented in memory location (Bars-J). This is stored using the STORE signal 12. Simultaneously the term PASSES is incremented by using ADDER 21. Also, simultaneously, the value of cell I is stored as the TYPE 19 (B/W) of the bar.

Within the same cycle then, J is incremented and width set to 1 before examination of the next cell.

The process repeats until the entire array has been processed, then repeats beginning with the examination of cell 1. Note that at the most, 1 bar may be output during a scan.

The process output is in the OUTPUT of DIVIDER 22; which is the estimated bar width 23 which is number of counts/number of pasess (17 & 18). The TYPE 19 is used as sign of the result indicating a black or white bar.

The RESET COMMAND 15 from the direction finder has the following effect: If the code processor has determined a valid bar has been read, (edit phase) the reset is delayed until this process is complete. This may be the case when a valid code is read and the data lift is removed from the paper immediately. If not in "edit" then the memory for COUNTS 17, PASSES 18 and TYPE 19 are cleared, BARS 8 is cleared and J (10) is cleared until direction is stable and valid start of FRAME 3 is received.

To give a more complete description of the processor in FIG. 5 a flow diagram of the processor operation is illustrated in FIG. 6.

FIG. 7 is a block diagram of the finite state direction finder. In the direction finder the black and white video and cell clock and start of frame enter the direction finder section of the bar width processor and RESET 15 and DIRECTION 14 are generated. RESET 15 occurs each time a constant change in directions occurs.

At each start of FRAME 3, if cell I has not changed type, for example, a bar entered or left via cell 1, the first white to black transistion is located. The location of this transition is labeled TRANS 30. TRANS is compared to old TRANS from the previous frame's first white to black transistion. The sign of this comparison is the tenative direction. If the magnitude of the result is equal to zero then a comparison is made with the old DIRECTION 31. If direction is not equal to old DIRECTION then RESET 15 goes active, resetting the bar width processor.

If the direction is the same, then the process is repeated with a new TRANS 30 pending the start of FRAME 3.

If the old cell 1 is not equal cell 1 then the first white to black transisition is merely stored. In the direction finding process the direction finder is an implementation of a simple scheme to determine whether bars are entering or leaving at cell 1 of the array. The process is designed such that no change is made unless sufficient information for a good decision process exists. In general the process is as follows:

The black to white edge nearest cell 1 is located. On the next frame, the nearest white to black transition is found. If cell 1 is changed or no such transition can be found, no decision is made. The two transition points are compared. If the second transition is nearer cell 1, direction is negative, for example, bars leave at the cell 1 end of the array. If the second transition is farther from cell 1 than the first, the direction is declared plus. If the change of direction is sensed, then the process is reset and width information erased. This process is repeated.

FIG. 9 is flow diagram of the direction finder.

Figure 1:
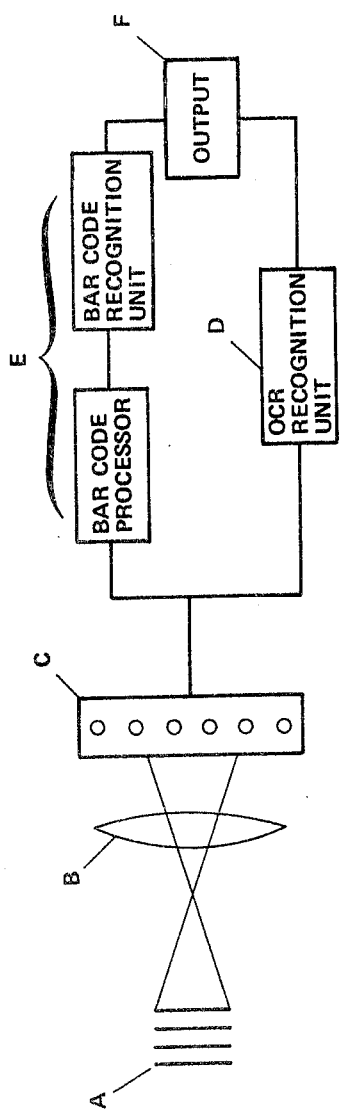
Figure 3:
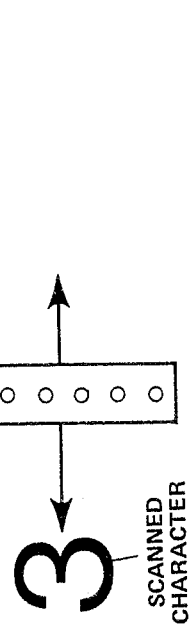
Figure 2:
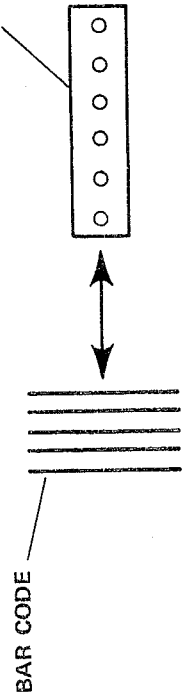
Figure 4:
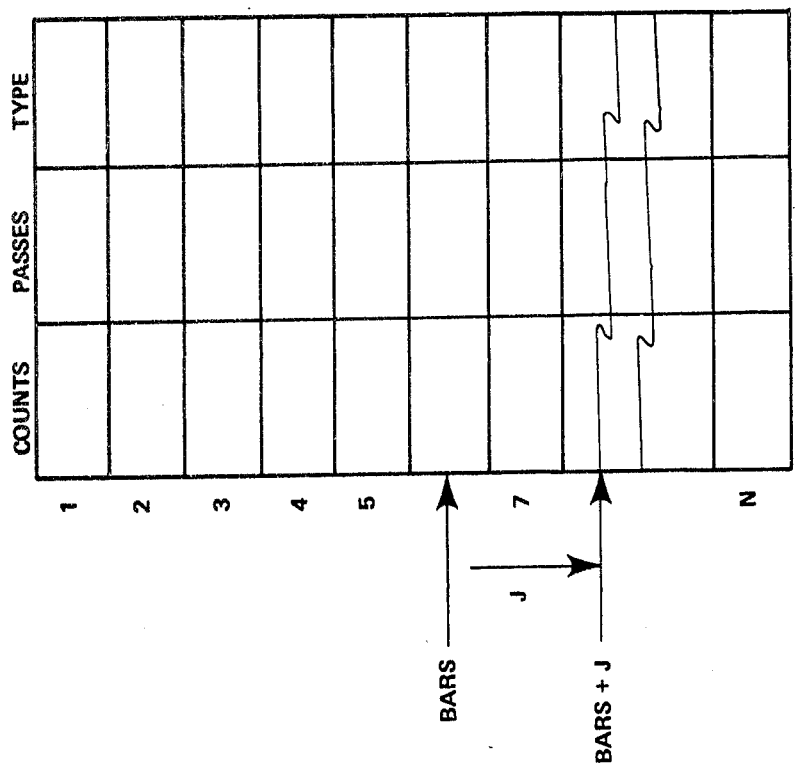
Figure 8:
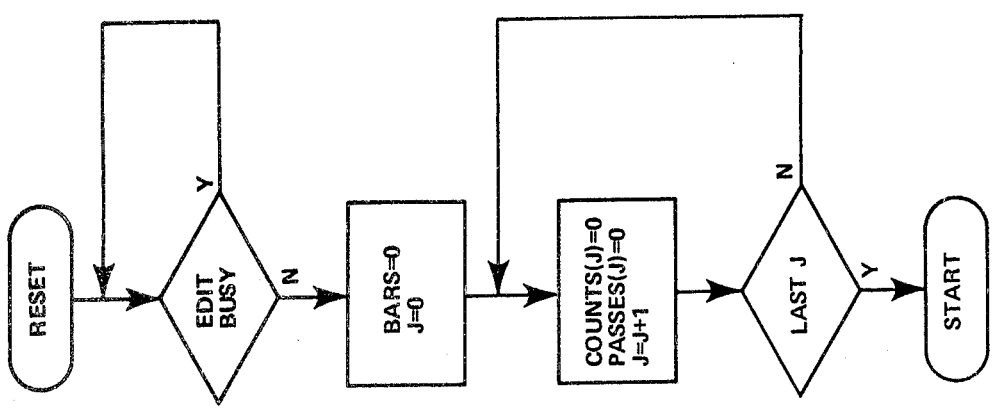
FIG. 8 is a flow diagram of the direction finder reset of the bar width processor.
Figure 5B:
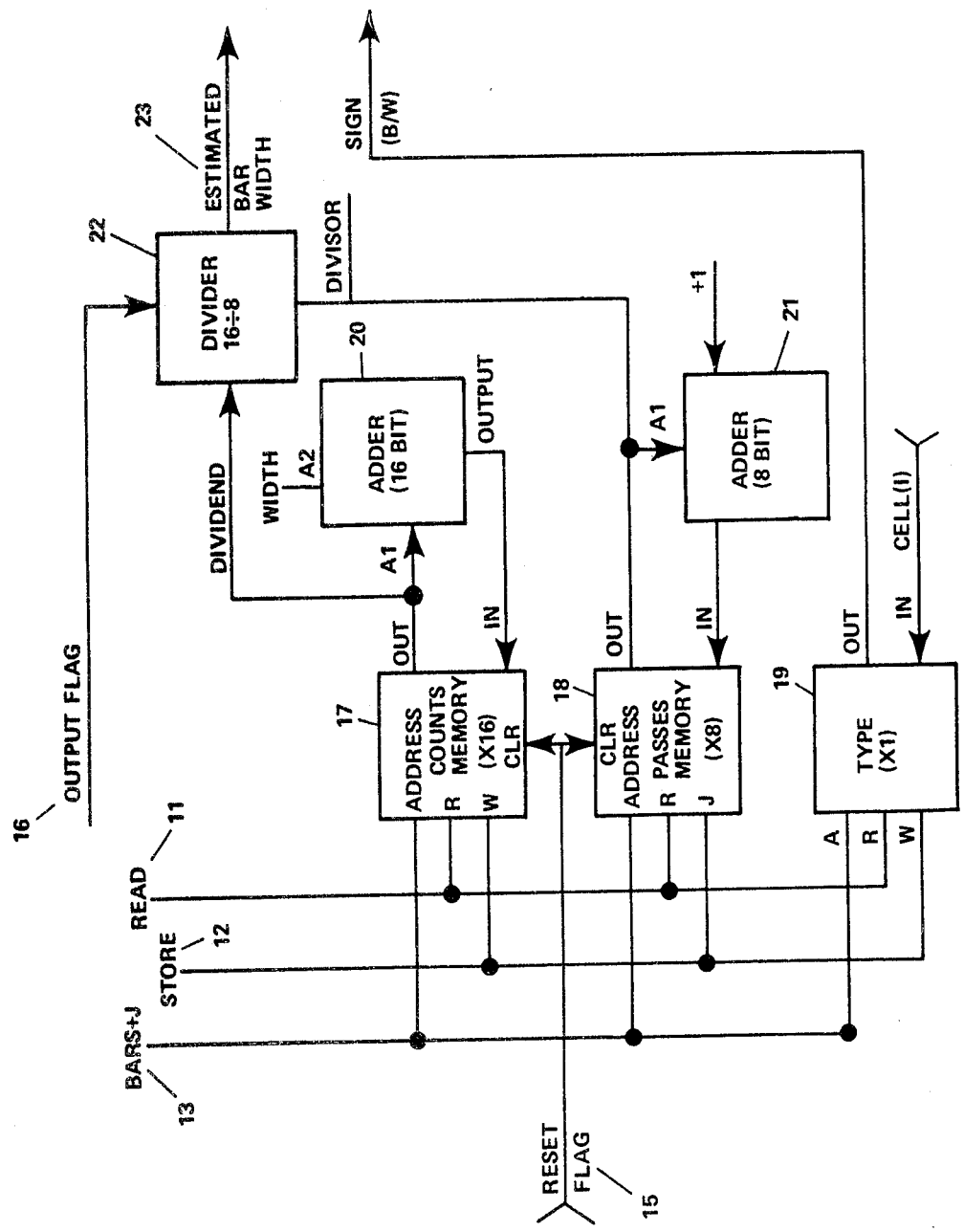
Figure 6:
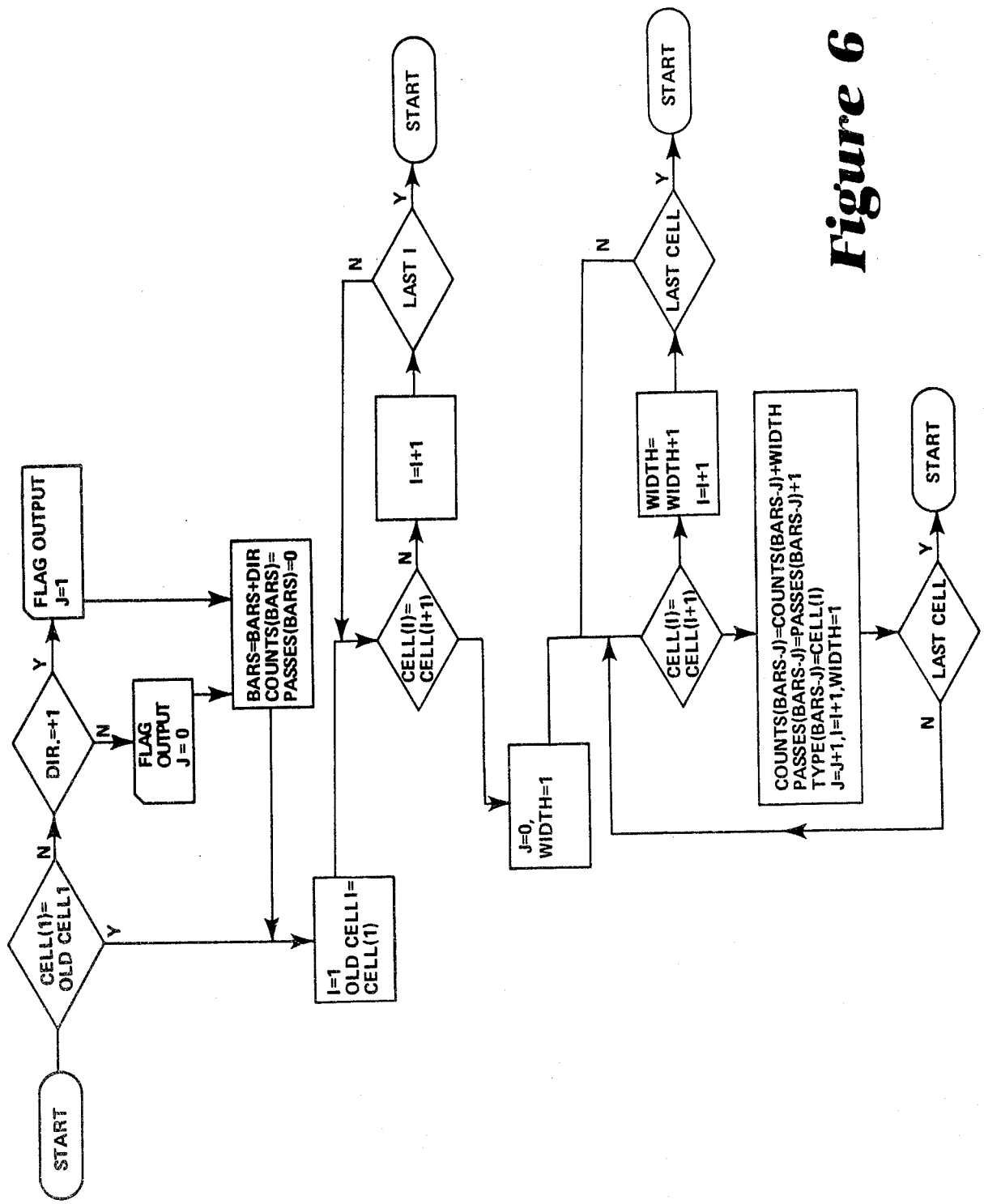
Figure 7:
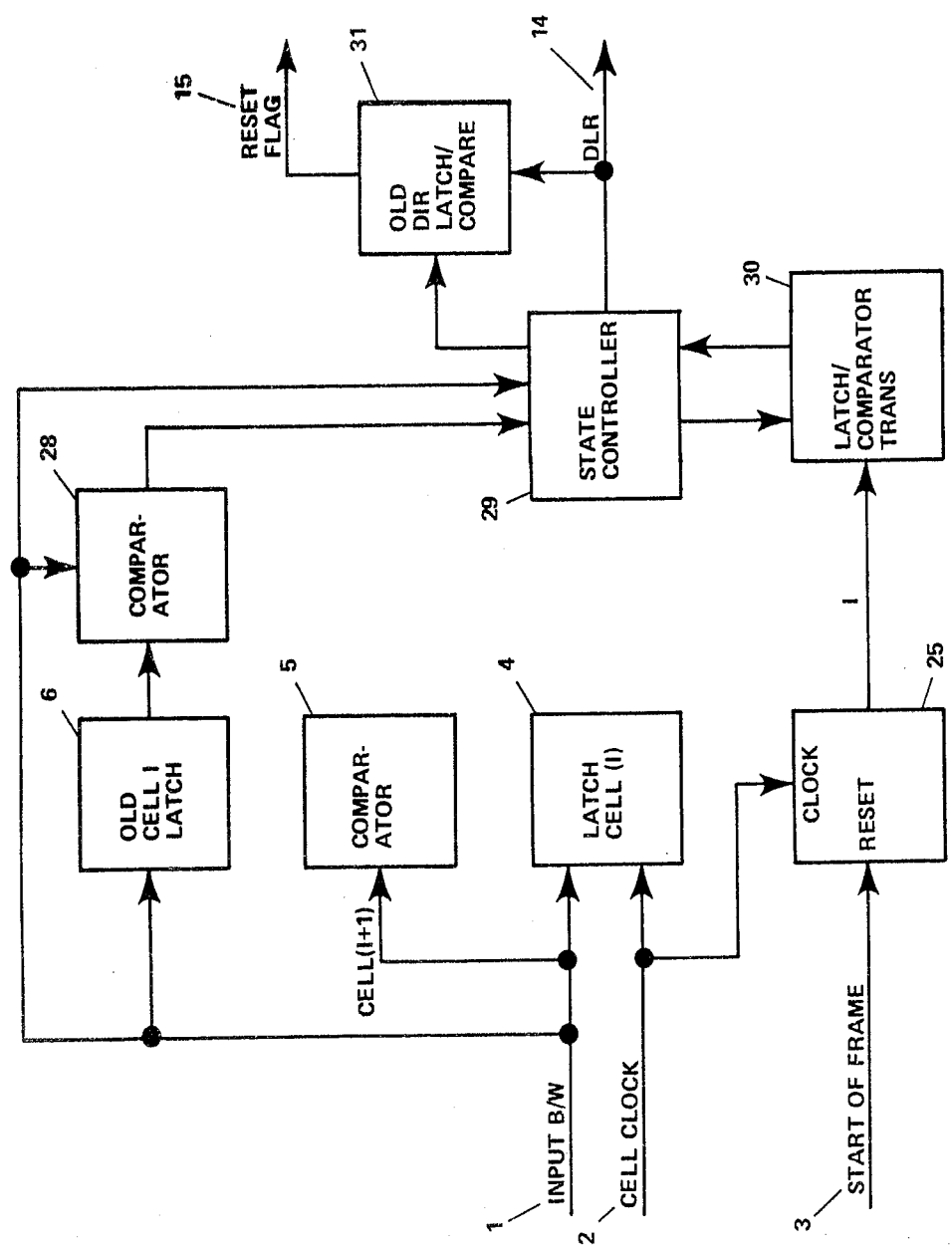

While specific examples of the invention have been given modification and changes will be apparent to those skilled in the art while changes and modifications may fall within the scope of the invention as defined by the following claims.

What is claimed:

1. An optical reader including a single columnar array of photo sensitive elements for producing video signals to be read by both bar code and alphanumeric readers, comprising; a first optical character processor for reading alphanumeric data, and a second processor for reading bar code data, said processor utilizing video signals from said array for reading alphanumeric data when the alphanumeric data is scanned perpendicular to the length of the array, and bar codes are scanned with the array parallel to the direction of scan.

2. The reader according to claim 1 wherein said preprocessor accepts video data scanned along the length of the columnar array when first scanned from either end of the array.

3. The reader according to claim 1 wherein the preprocessor includes both a bar code direction processor and a bar code width processor.

4. The reader according to claim 3 wherein the bar code width processor measures the width of each bar code and includes a memory to store the results of each bar width measurement.

5. The reader according to claim 3 in which the bar code width processor measures the width of a bar a plurality of times and takes the average of the measurement to obtain an accurate average measurement of the bar width.

6. The reader according to claim 5 wherein the bar width processor also measures the width of each space between the bars.

7. The reader according to claim 3 wherein the bar code direction processor identifies the direction in which the bar code is scanned.

8. In a bar code reader a preprocessor for accepting video signals from a single columnar array of photo sensitive elements when the bar code is scanned longitudinally along the array, each photo sensitive element scanning each bar code and the space between each bar code, said processor including means for measuring bar widths and widths of spaces between the bars independent of speed of the scanning array as it moves across the bar code bars, and means for determining from which end of the columnar array scanning started.

9. The preprocessor according to claim 8 wherein the means for determining the width of a bar code or space measures the width a plurality of times and takes an average, outputting data representative of the bar or space width and indicative of whether the width is of a bar or space.

* * * * *

UNITED STATES PATENT AND TRADEMARK OFFICE
CERTIFICATE OF CORRECTION

PATENT NO. : 4,411,016
DATED : October 18, 1983
INVENTOR(S) : Charles A. Wakeland It is certified that error appears in the above—identified patent and that said Letters Patent is hereby corrected as shown below:

Column 5, line 3, delete "constant" and insert --consistent-- therefor.

Column 5, line 39, after "is" insert --a--.

Signed and Sealed this

Fourteenth Day of February 1984

[SEAL]

Attest:

GERALD J. MOSSINGHOFF

Attesting Officer     Commissioner of Patents and Trademarks